US012760477B2

(12) United States Patent
Askari et al.

(10) Patent No.: US 12,760,477 B2
(45) Date of Patent: Oct. 13, 2026

(54) ROAD ROUGHNESS SYSTEM FOR A VEHICLE

(71) Applicant: GM Global Technology Operations LLC, Detroit, MI (US)

(72) Inventors: Hassan Askari, Thornhill (CA); Mohammadali Shahriari, Markham (CA); Reza Zarringhalam, Whitby (CA); Khizar Ahmad Qureshi, Pickering (CA); Matan Yeger, Pardes Hanna-Karkur (IL); Mehdi Abroshan, Waterloo (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/953,349

(22) Filed: Nov. 20, 2024

(65) Prior Publication Data

US 2026/0139446 A1 May 21, 2026

(51) Int. Cl.
*E01C 23/01* (2006.01)
*B60W 30/18* (2012.01)

(52) U.S. Cl.
CPC ....... *E01C 23/01* (2013.01); *B60W 30/18009* (2013.01); *B60W 2552/35* (2020.02); *B60W 2720/10* (2013.01)

(58) Field of Classification Search
CPC ............ E01C 23/01; B60W 30/18009; B60W 2552/35; B60W 2720/10
USPC ........................................................... 701/70
See application file for complete search history.

(56) References Cited

U.S. PATENT DOCUMENTS

| | | | | |
|---|---|---|---|---|
| 6,223,115 | B1 * | 4/2001 | Batistic | B60T 8/1755 701/72 |
| 10,953,887 | B2 * | 3/2021 | Magnusson | G08G 1/164 |
| 11,673,553 | B2 * | 6/2023 | Burford | B60W 30/18054 701/70 |
| 2010/0161190 | A1 * | 6/2010 | McCann | F16D 48/06 280/446.1 |
| 2012/0095659 | A1 * | 4/2012 | Rodrigues | B60K 28/165 701/69 |

(Continued)

FOREIGN PATENT DOCUMENTS

| | | | |
|---|---|---|---|
| DE | 102014200031 | A1 | 7/2014 |
| DE | 102017101447 | A1 | 8/2017 |
| DE | 102022107893 | A1 | 10/2022 |

*Primary Examiner* — Kurt Philip Liethen
*Assistant Examiner* — John D Bailey
(74) *Attorney, Agent, or Firm* — Honigman LLP; Matthew H. Szalach

(57) ABSTRACT

A method including receiving, at a road roughness algorithm, a plurality of sensor data, determining, via the road roughness algorithm, the wheel data exceeds a wheel threshold and a severity level exceeding the wheel threshold, executing a wheel flag, determining, based on the wheel flag, the ride height data exceeds a ride height threshold, executing a ride height flag, determining, based on the wheel flag and the ride height flag, a time duration of a wheel jerk of the wheel data exceeds a time threshold, identifying, via the road roughness algorithm, a change in IMU that exceed an IMU threshold, executing, based on the change in the IMU exceeding the IMU threshold, an IMU flag, adjusting, based on the IMU flag, parameters of the road roughness algorithm, and fusing the wheel flag, the ride height flag, and the IMU flag to define a road anomaly.

20 Claims, 10 Drawing Sheets

(56) References Cited

U.S. PATENT DOCUMENTS

| | | | | |
|---|---|---|---|---|
| 2012/0214641 | A1* | 8/2012 | McCann | B60K 17/20 477/35 |
| 2012/0271526 | A1* | 10/2012 | Oishi | B60T 7/042 701/99 |
| 2014/0121870 | A1* | 5/2014 | Lee | B60W 20/10 477/3 |
| 2015/0203117 | A1* | 7/2015 | Kelly | B60W 40/06 701/91 |
| 2016/0185216 | A1* | 6/2016 | Clarke | B60K 17/35 74/665 F |
| 2017/0190330 | A1* | 7/2017 | Kelly | B60W 30/02 |
| 2018/0201182 | A1* | 7/2018 | Zhu | B60Q 1/535 |
| 2018/0326956 | A1* | 11/2018 | Zhu | B60T 17/22 |
| 2021/0031776 | A1* | 2/2021 | Shibata | B60K 35/22 |
| 2021/0078619 | A1* | 3/2021 | Morita | B61L 15/0027 |
| 2021/0213948 | A1* | 7/2021 | Lahti | B60W 30/162 |
| 2022/0281456 | A1* | 9/2022 | Giovanardi | G08G 1/0112 |
| 2022/0324421 | A1* | 10/2022 | Giovanardi | G08G 1/0145 |
| 2023/0202501 | A1* | 6/2023 | Onimaru | B60W 50/14 340/425.5 |
| 2023/0234602 | A1* | 7/2023 | Onimaru | B60W 50/14 340/905 |
| 2023/0358559 | A1* | 11/2023 | Lihoshi | G01C 21/3815 |
| 2024/0308528 | A1* | 9/2024 | Onimaru | G08G 1/0141 |

* cited by examiner

ROAD ROUGHNESS SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a road roughness system for a vehicle.

Vehicles often travel along roads that have irregularities, such as potholes, bumps, an uneven surface, or other irregularities that may cause disturbance to the ride of the vehicle. While some vehicles may be equipped with features that may indicate that the vehicle is outside of a designated lane, and potentially encountering chatter bumps, there is a need for a corrective or otherwise mitigating action to avoid road irregularities. Some vehicles may utilize a visual system, such as cameras, to identify road irregularities and report the road irregularities to the driver. However, there is a need for a system that identifies the irregularities and takes mitigating action to prevent or minimize contact between the vehicle and the road irregularities.

SUMMARY

In some aspects, a computer-implemented method when executed by data processing hardware causes the data processing hardware to perform operations. The operations receiving, at a road roughness algorithm, a plurality of sensor data from a plurality of sensors of a vehicle, the sensor data including wheel data and ride height data, determining, via the road roughness algorithm, the wheel data exceeds a wheel threshold and a severity level associated with the wheel data exceeding the wheel threshold, executing, based on the wheel data exceeding the wheel threshold, a wheel flag, and determining, based on the wheel flag, the ride height data exceeds a ride height threshold. The operations also include executing, based on the ride height exceeding the ride height threshold, a ride height flag, determining, based on the wheel flag and the ride height flag, a time duration of a wheel jerk of the wheel data exceeds a time threshold, and identifying, via the road roughness algorithm, a change in initial measurement units (IMU) that exceed an IMU threshold. The operations further include executing, based on the change in the IMU exceeding the IMU threshold, an IMU flag, adjusting, based on the IMU flag, one or more parameters of the road roughness algorithm, and fusing, via the road roughness algorithm, the wheel flag, the ride height flag, and the IMU flag to define a road anomaly.

In some examples, adjusting the one or more parameters may include identifying a severity level of the one or more parameters. The operations may also include mitigating the road anomaly and executing, via the road roughness algorithm, a control and mitigation function. Optionally, the wheel data may include wheel jerk data. In some instances, the wheel flag may include one or more wheel identifications (IDs), the road roughness algorithm is configured to identify a wheel of the vehicle based on the wheel IDs. In other examples, mitigating the road anomaly may include adjusting the wheel corresponding to the wheel ID. In further examples, mitigating the road anomaly may include reducing a speed of the vehicle. Optionally, determining the wheel data exceeds the wheel threshold may include generating a second derivative of the wheel data and identifying the wheel jerk of the wheel data. In other instances, the IMU may include at least two primary components and identifying the change in the IMU may include identifying a change in the at least two primary components exceed the threshold of the IMU.

In further aspects, a road roughness system for a vehicle includes data processing hardware and memory hardware in communication with the data processing hardware. The memory hardware stores instructions that when executed on the data processing hardware cause the data processing hardware to perform operations. The operations include receiving, at a road roughness algorithm, a plurality of sensor data from a plurality of sensors of a vehicle, the sensor data including wheel data and ride height data, determining, via the road roughness algorithm, the wheel data exceeds a wheel threshold and a severity level associated with the wheel data exceeding the wheel threshold, executing, based on the wheel data exceeding the wheel threshold and the severity level of the wheel data, a wheel flag, and determining, based on the wheel flag, the ride height data exceeds a ride height threshold. The operations also include executing, based on the ride height exceeding the ride height threshold, a ride height flag, determining, based on the wheel flag and the ride height flag, a time duration of a wheel jerk of the wheel data exceeds a time threshold, and identifying, via the road roughness algorithm, a change in initial measurement units (IMU) that exceed an IMU threshold. The operations further include executing, based on the change in the IMU exceeding the IMU threshold, an IMU flag, adjusting, based on the IMU flag, one or more parameters of the road roughness algorithm, and fusing, via the road roughness algorithm, the wheel flag, the ride height flag, and the IMU flag to define a road anomaly.

In some examples, adjusting the one or more parameters may include identifying a severity level of the one or more parameters. The operations may also include mitigating the road anomaly and executing, via the road roughness algorithm, a control and mitigation function. Optionally, the wheel data may include wheel jerk data. In some instances, the wheel flag may include one or more wheel identification (ID), the road roughness algorithm may be configured to identify a wheel of the vehicle based on the wheel ID. In other examples, mitigating the road anomaly may include adjusting the wheel corresponding to the wheel ID. In further instances, mitigating the road anomaly may include reducing a speed of the vehicle. Optionally, determining the wheel data exceeds the wheel threshold may include generating a second derivative of the wheel data and identifying the wheel jerk of the wheel data. In some examples, the IMU may include at least two primary components and identifying the change in the IMU may include identifying a change in the at least two primary components exceed the threshold of the IMU.

In other aspects, a road roughness system for a vehicle includes data processing hardware and memory hardware in communication with the data processing hardware. The memory hardware stores instructions that when executed on the data processing hardware cause the data processing hardware to perform operations. The operations receiving, at a road roughness algorithm, a plurality of sensor data from a plurality of sensors of a vehicle, the sensor data including wheel data and ride height data, determining, via the road roughness algorithm, the wheel data exceeds a wheel threshold and a severity level associated with the wheel data exceeding the wheel threshold, the wheel data including wheel identifications (IDs) associated with a respective wheel of the vehicle, executing, based on the wheel data exceeding the wheel threshold, a wheel flag, and determining, in response to the wheel flag, the ride height data exceeds a ride height threshold. The operations also include executing, based on the ride height data exceeding the ride height threshold, a ride height flag, determining, in response to the wheel flag and the ride height flag, a time duration of a wheel jerk of the wheel data exceeds a time threshold, and identifying, via the road roughness algorithm, a change in initial measurement units (IMU) that exceed an IMU threshold. The operations further include executing, based on the change in IMU exceeding the IMU threshold, an IMU flag, adjusting, in response to the IMU flag, one or more parameters of the road roughness algorithm, fusing, via the road roughness algorithm, the wheel flag, the ride height flag, and the IMU flag to define a road anomaly, and mitigating the road anomaly and executing, via the road roughness algorithm, a control and mitigation function.

In some examples, mitigating the road anomaly may include at least one of adjusting the wheel corresponding to the respective wheel ID and reducing a speed of the vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
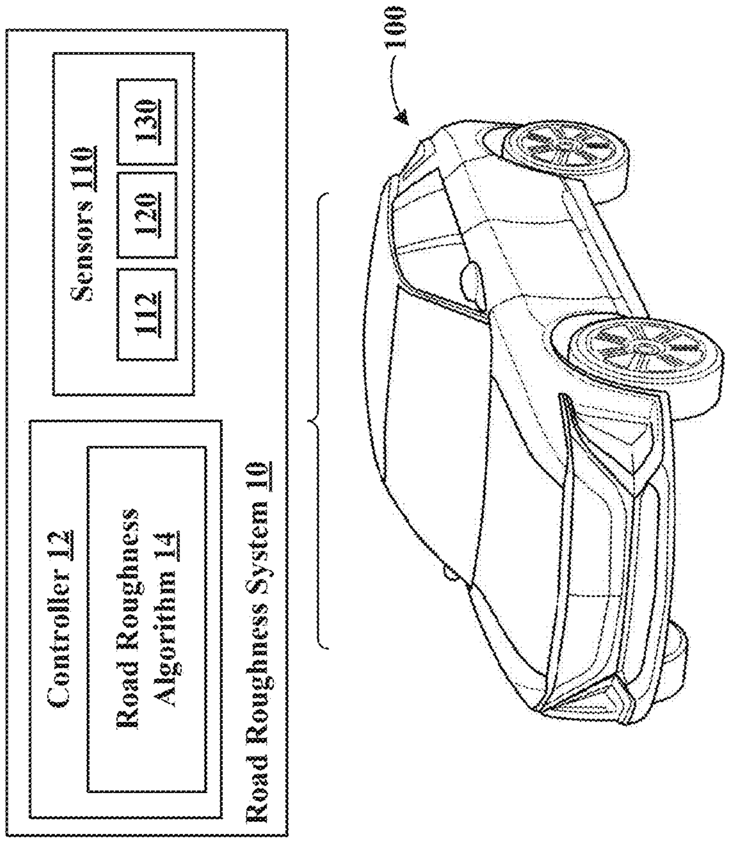
FIG. 1 is a schematic of a vehicle equipped with a road roughness system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
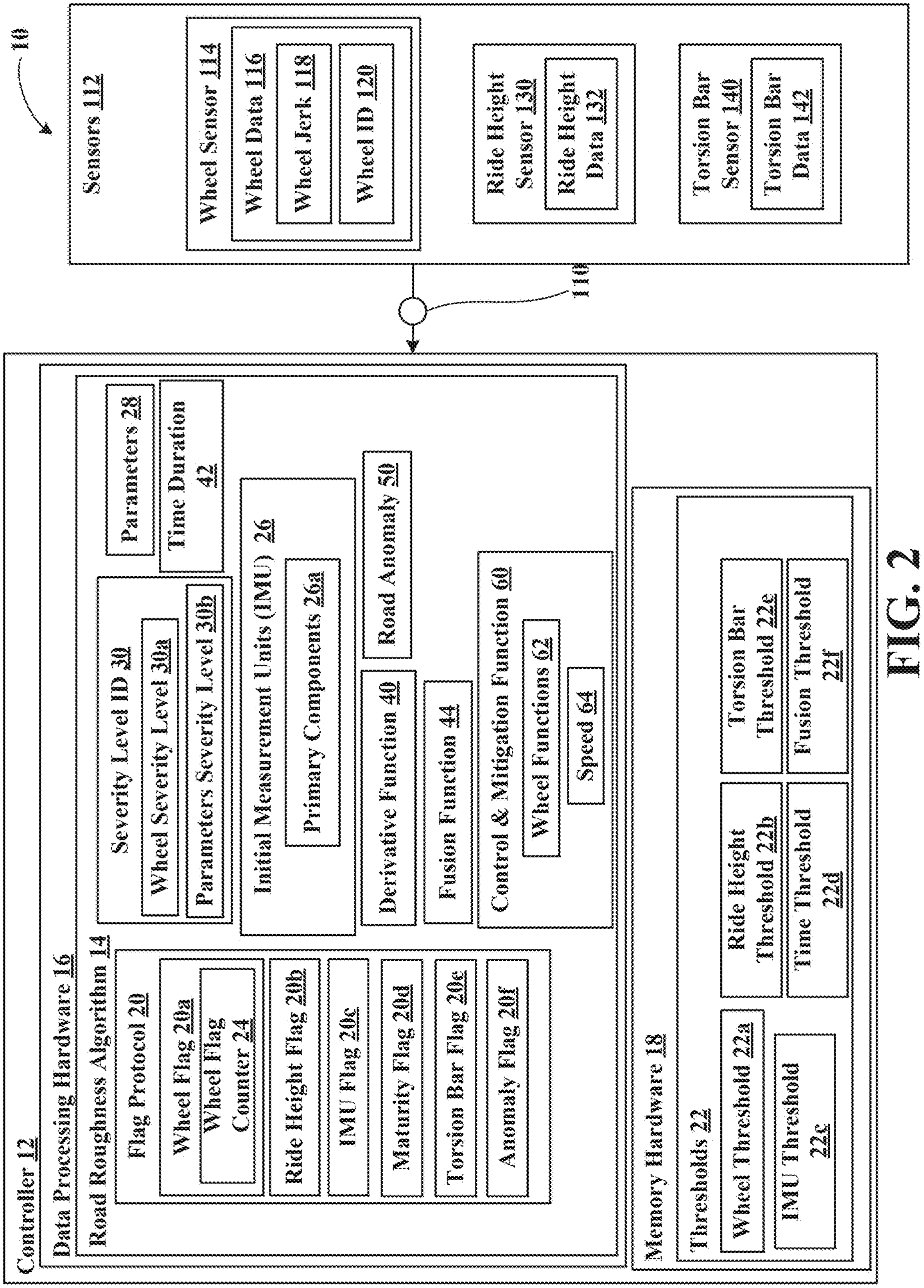
FIG. 2 is an exemplary block diagram of a road roughness system according to the present disclosure.
Figure 3:
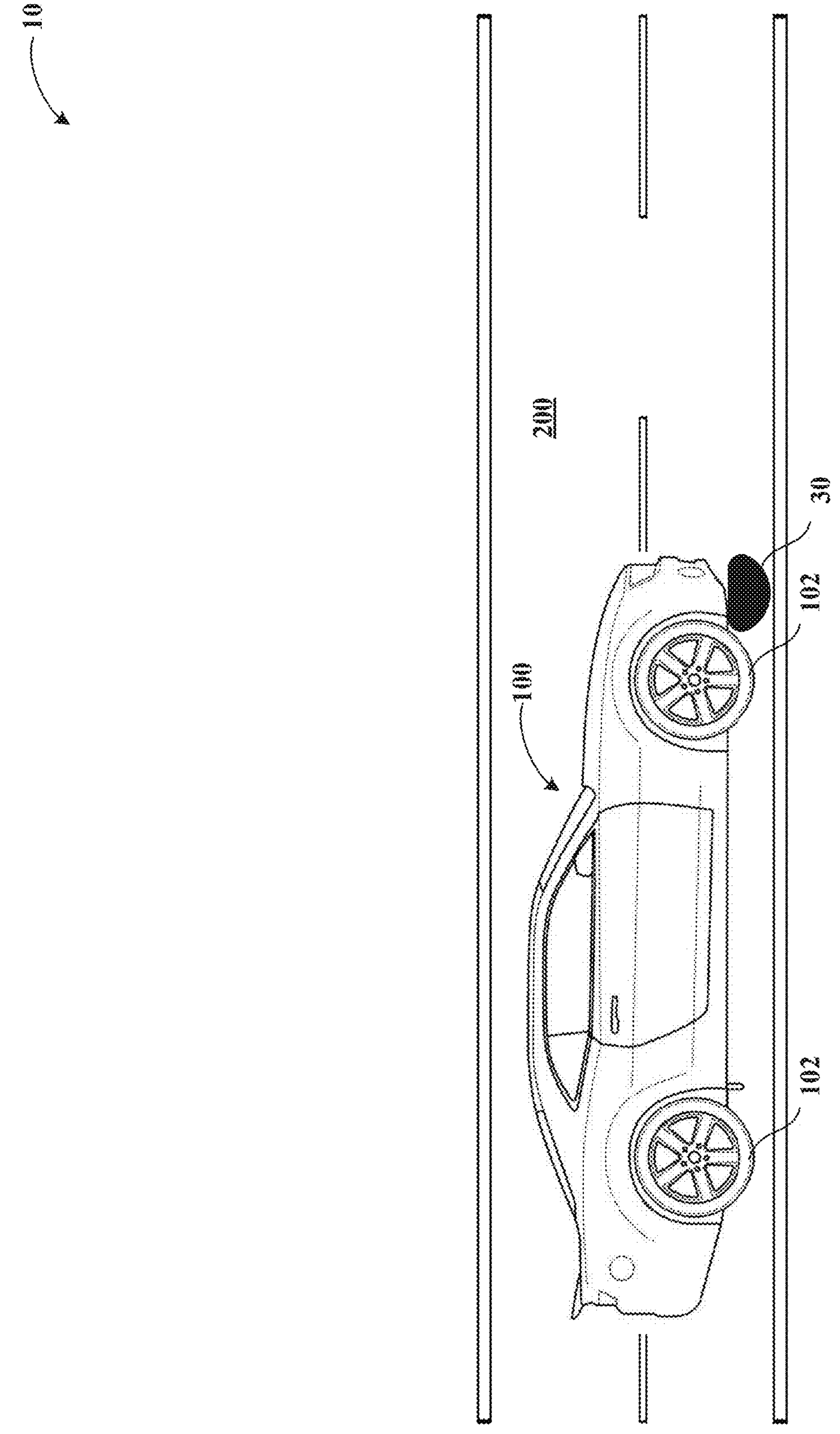
FIG. 3 is a schematic of a vehicle equipped with the road roughness system according to the present disclosure, the vehicle traveling along a roadway with a road anomaly.

Referring to FIGS. 1-3, a road roughness system 10 includes a controller 12 configured as part of a vehicle 100. The controller 12 is configured with a road roughness algorithm 14 responsive to sensor data 110 received from a plurality of sensors 112 of the vehicle 100. For example, the sensors 112 may include a wheel sensor 114 configured to transmit wheel data 116 to the road roughness algorithm 14. The wheel data 116 may include wheel jerk 118 and one or more wheel identifications (IDs) 120. For example, the vehicle 100 includes a plurality of wheels 102 that may be associated with the wheel IDs 120, such that the wheel data 116 may identify wheel jerk data or wheel jerk 118 in one or more of the wheels 102 associated with a respective wheel ID 120. The sensors 112 may also include, but are not limited to, a ride height sensor 130 configured to capture ride height data 132 and a torsion bar sensor 140 configured to capture torsion bar data 142. The sensor data 110 is communicated to the controller 12 for use with the road roughness algorithm 14, described herein.

The controller 12 also includes data processing hardware 16 and memory hardware 18 in communication with the data processing hardware 16. The memory hardware 18 stores instructions that when executed on the data processing hardware 16 cause the data processing hardware 16 to perform operations associated with the road roughness algorithm 14, described herein. The road roughness algorithm 14 is configured to execute a flag protocol 20 in which various flags 20*a*-20*f* are executed. The flags 20*a*-20*f* include, but are not limited to, a wheel flag 20*a*, a ride height flag 20*b*, an initial measurement unit (IMU) flag 20*c*, a maturity flag 20*d*, a torsion bar flag 20*e*, and an anomaly flag 20*f*, each described further below.

The memory hardware 18 stores thresholds 22 that are used by the road roughness algorithm 14 to determine whether to execute the flag protocol 20. The thresholds 22 include, but are not limited to, a wheel threshold 22*a*, a ride height threshold 22*b*, an IMU threshold 22*c*, a time threshold 22*d*, and a torsion bar threshold 22*e*. Each threshold 22 is utilized by the flag protocol 20 to determine whether to execute a respective flag 20*a*-20*d*. The wheel flag 20*a* may be equipped with a wheel flag counter 24 that tracks the wheel flag 20*a* to identify a count associated with the wheel flag 20*a*, described in more detail below. The road roughness threshold 14 is also configured with initial measurement units (IMU) 26 and parameters 28 that are also utilized with the flag protocol 20, described in more detail below.

The road roughness algorithm 14 is further configured with a severity level identification (ID) 30 that associates a respective severity level 30*a*, 30*b* with the flag protocol 20 and sensor data 110 received by the controller 12. The severity level ID 30 includes, but is not limited to, a wheel severity level 30*a* and a parameters severity level 30*b*. The severity levels 30*a*, 30*b* may be represented as various levels including, but not limited to, a low/medium/high level scale or a zero (0) to 100 scale. For example, the road roughness algorithm 14 may assess the wheel data 116 and determine that the wheel data 116, based on a construct of the wheel data 116, has a medium severity level 30*a*.

Figure 4:
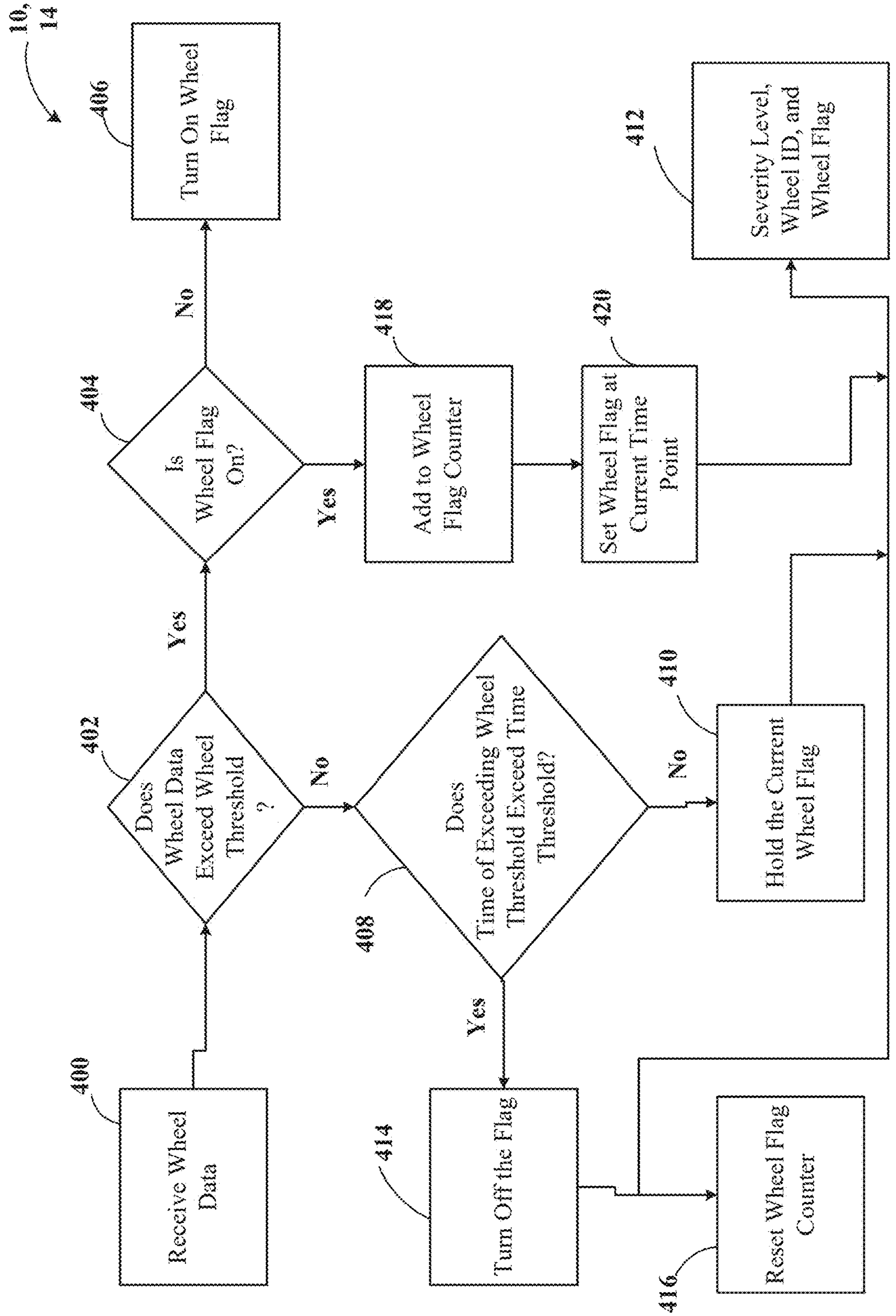
FIGS. 4-9 are exemplary flow diagrams of a road roughness system according to the present disclosure.

With reference to FIGS. 2-4, the flag protocol 20 is described with respect to the wheel data 116 received from the wheel sensor 114. The road roughness algorithm 14 receives the wheel data 116 and utilizes the wheel jerk 118. The wheel jerk 118 is identified by the by the road roughness algorithm 14 by executing a derivation function 40. The derivation function 40 is configured to generate a second derivative of the wheel data 116 to identify the wheel jerk 118. The wheel jerk 118 provides the road roughness algorithm 14 with a higher resolution of the wheels 102 along a roadway 200. For example, the road roughness algorithm 14, via the derivative function 40, assesses the amplitude of the wheel jerk 118 with a higher degree of clarity as a result of a reduced signal-to-noise ratio.

The road roughness algorithm 14 assess a value of the wheel jerk 118 at a given timeframe and compares the wheel jerk 118 at the given timeframe with a previous time step. Thus, the road roughness algorithm 14 assess a time duration 42 of the wheel jerk 118 when determining whether to execute the flag protocol 20. The time duration 42 may also be utilized in later operations by the road roughness algorithm 14. For example, the road roughness algorithm 14 may utilize the wheel flag 20*a* and the ride height flag 20*b* to determine the time duration 42 of the wheel jerk 118 of the wheel data 116 exceeds the time threshold 22*d*. The time duration 42 may be compared to a maturity flag 20*d*. If the road roughness algorithm 14 identifies a condition of the vehicle 100 from the wheel data 116 and determines, based on the comparison of the time duration 42 with the time threshold 22*d*, that the vehicle 100 has experienced the condition for a period of time, then the road roughness algorithm 14 may raise the maturity flag 20*d*.

Similarly, the road roughness algorithm 14 utilizes the wheel data 116 to identify the wheel jerk 118 and determine whether the wheel data 116 (i.e., the wheel jerk 118) exceeds the wheel threshold 22*a*. If the wheel data 116 exceeds the wheel threshold 22*a*, then the road roughness algorithm 14 may raise the wheel flag 20*a*. If the wheel flag 20*a* is already issued by the flag protocol 20, then the road roughness algorithm 14 may add to the wheel flag counter 24 to increase the incremented counter associated with triggered wheel flags 20*a* by the flag protocol 20. In addition to issuing or otherwise executing the wheel flag 20*a*, the road roughness algorithm 14 determines the wheel severity level 30*a*.

The wheel severity level 30*a* is associated with the wheel data 116 (i.e., the wheel jerk 118) exceeding the wheel threshold 22*a*. The road roughness algorithm 14 may also utilize the wheel flag counter 24 to monitor and generate the wheel severity level 30*a*. For example, if the wheel flag counter 24 is high, then the road roughness algorithm 14 may determine a higher wheel severity level 30*a*. As mentioned above, the wheel severity level 30*a* is dependent upon the construct of the signals (i.e., the wheel data 116) received from the wheel sensor 114. The wheel data 116 also provides the road roughness algorithm 14 with the wheel ID 120 for each wheel 102 of the vehicle 100. Accordingly, the wheel flag 20*a* may include one or more wheel IDs 120, which the road roughness algorithm 14 utilizes to identify which wheel(s) 102 of the vehicle 100 is experiencing the wheel jerk 118. The wheel ID 120 is included with the wheel flag 20*a*. The wheel flag 20*a* includes an indication of a road anomaly 50, the wheel severity level 30*a*, and the wheel ID(s) 120 of the wheel 102 experiencing the road anomaly 50.

Figure 5:
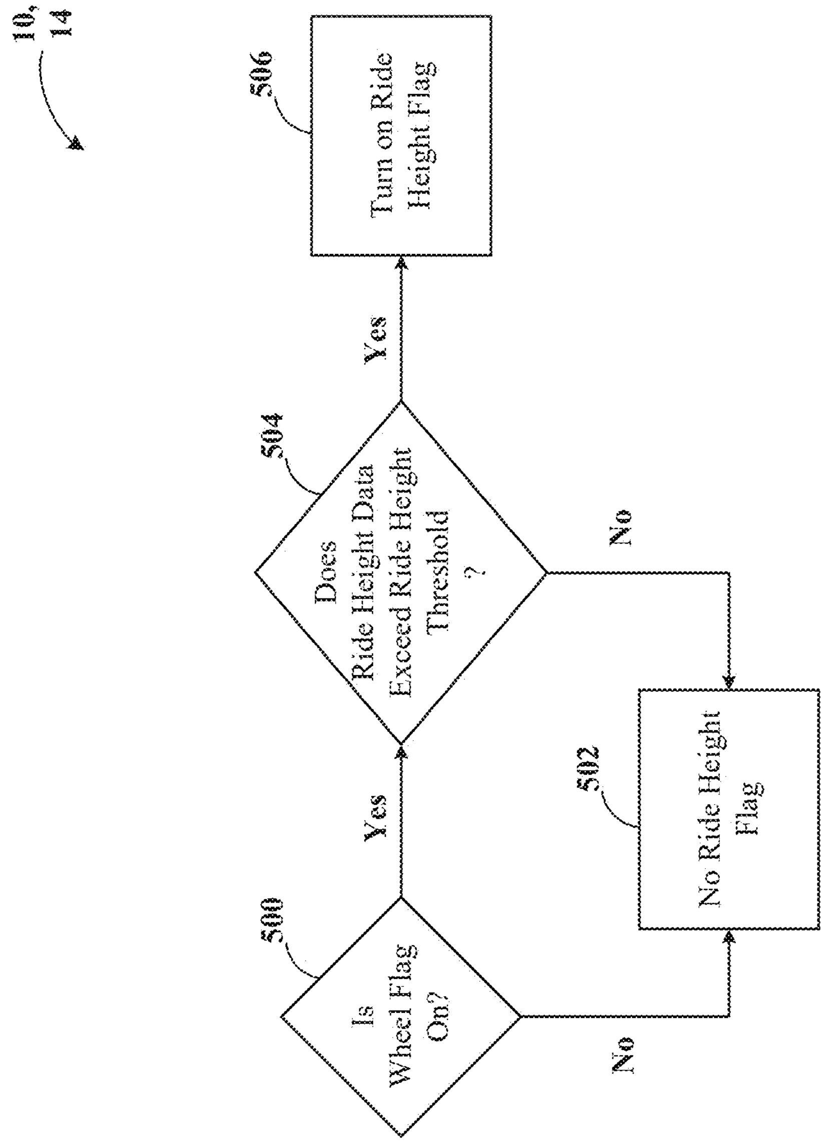

With reference to now FIGS. 2, 3, and 5, the road roughness algorithm 14 assesses the ride height data 132 once the assessment of the wheel data 116 is complete. The ride height data 132 provides the road roughness algorithm 14 with information as to a relative displacement or change of position in each of the wheels 102 and/or in the suspension of the vehicle 100. The road roughness algorithm 14 compares the ride height data 132 with the ride height threshold 22*b* to determine whether the ride height data 132 exceeds the ride height threshold 22*b* and to raise the ride height flag 20*b*. Prior to execution of the ride height flag 20*b*, the road roughness algorithm 14 first assesses the wheel data 116.

For example, the road roughness algorithm 14 first determines whether the wheel flag 20*a* is set or otherwise executed prior to assessing the ride height data 132. If the wheel flag 20*a* is not executed, then the road roughness algorithm 14 may re-check the wheel data 116 based on the ride height data 132 to verify the potential of a road anomaly 50. The road roughness algorithm 14 determines, in response to the wheel flag 20*a*, whether the ride height data 132 exceeds the ride height threshold 22*b*. If the wheel flag 20*a* is executed and the ride height data 132 exceeds the ride height threshold 22*b*, then the road roughness algorithm 14 executes the ride height flag 20*b*.

Figure 6:
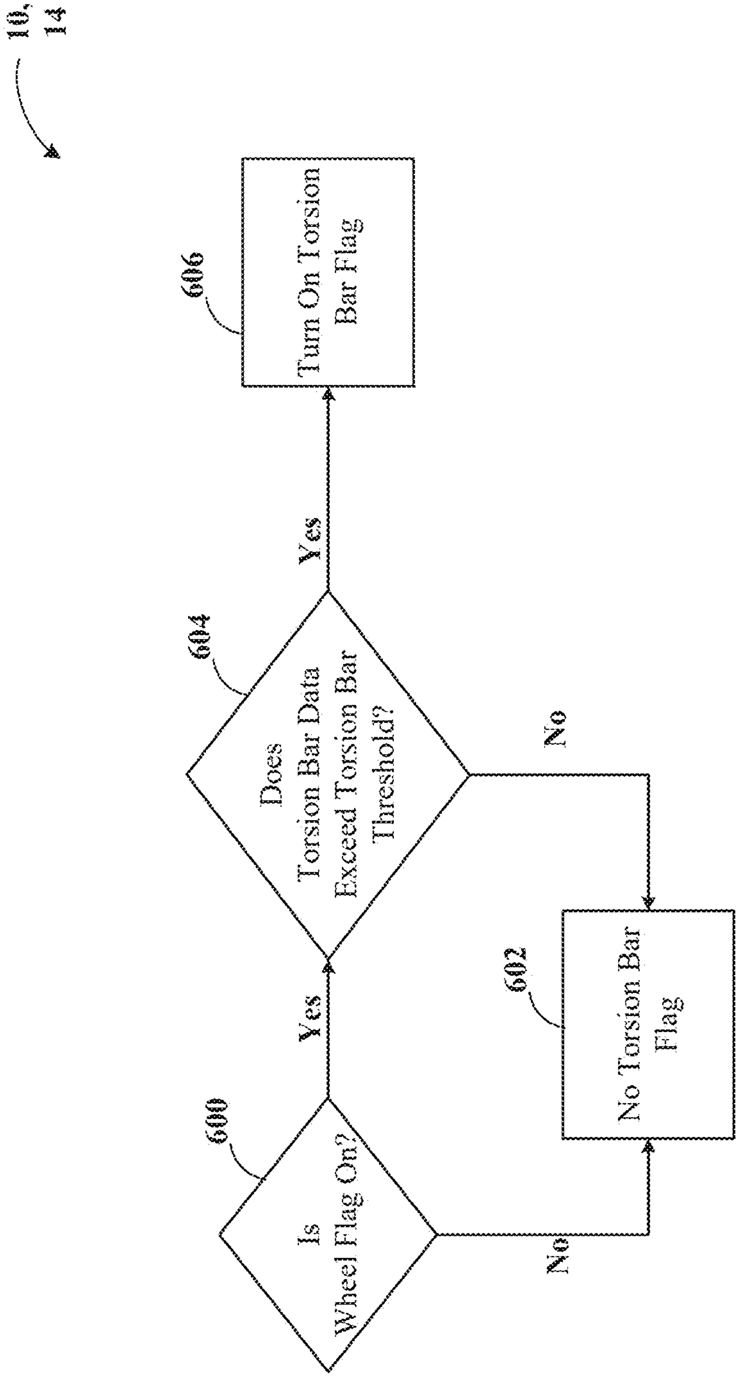

With reference to FIGS. 2, 3, and 6, the road roughness algorithm 14 next assesses the torsion bar data 142 after assessing the wheel data 116 and the ride height data 132. The torsion bar data 142 is compared with the torsion bar threshold 22*e* to determine whether the torsion bar data 142 exceeds the torsion bar threshold 22*e*. The comparison of the torsion bar data 142 with the torsion bar threshold 22*e* may assist the road roughness algorithm 14 in verifying the wheel jerk 118 identified above. Thus, the torsion bar data 142 may be used as a validation check for the wheel flag 20*a* and the ride height flag 20*b*. If the torsion bar data 142 exceeds the torsion bar threshold 22*e*, then the road roughness algorithm 14 may execute the torsion bar flag 20*e*.

Figure 7:
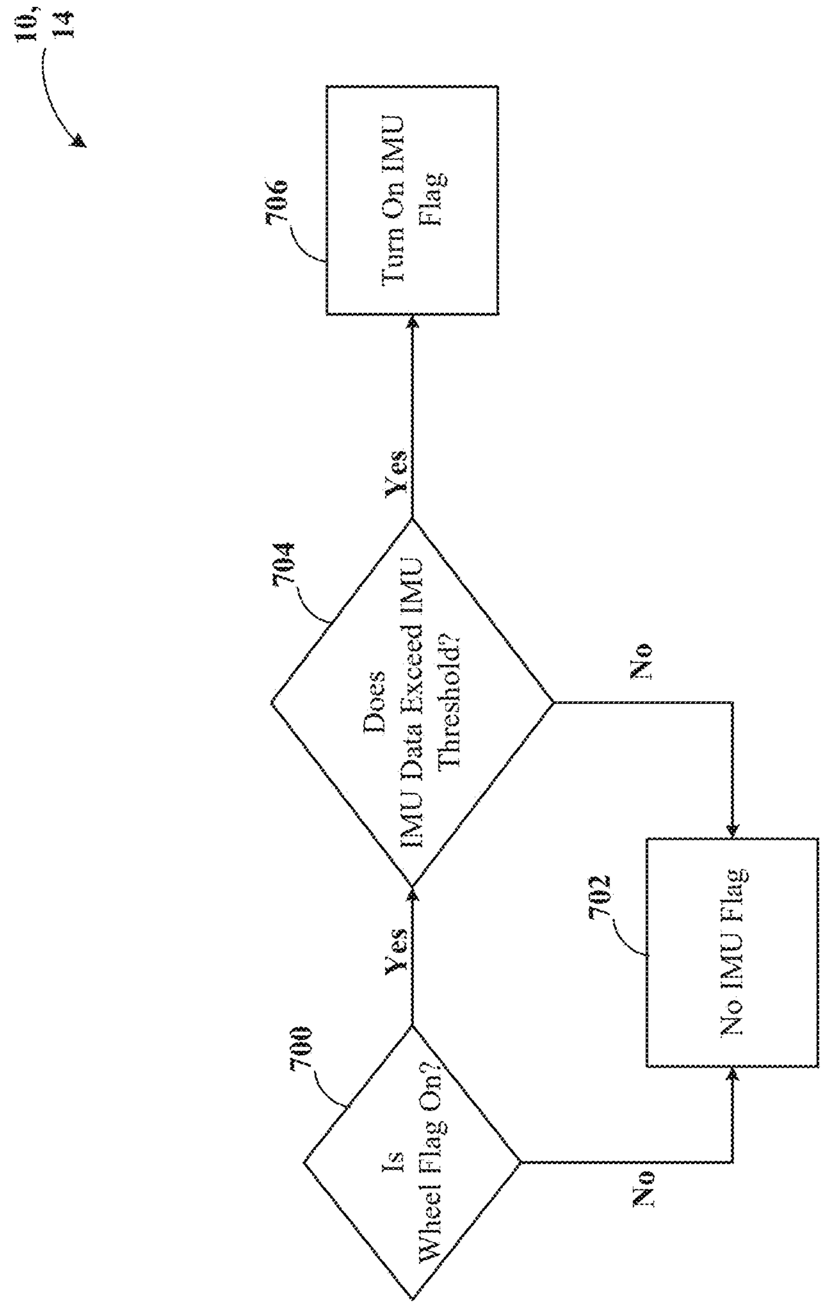

Referring now to FIGS. 2, 3, and 7, the road roughness algorithm 14 may be configured with the IMU 26. For example, the IMU 26 may be configured as a six (6) stop IMU 26 with various angular components. For each of the components, the road roughness algorithm 14 checks a potential change for a given component with the IMU threshold 22*c*. If the change in the IMU 26 exceeds the IMU threshold 22*c*, then the road roughness algorithm 14 executes the IMU flag 20*c*. Of the exemplary six (6) components, the IMU 26 includes at least two primary components 26*a*. In some instances, the road roughness algorithm 14 may identify a change in the primary components 26*a* that exceeds the IMU threshold 22*c*, while the remaining components may remain unchanged or have less significant change. The change in the primary components 26*a* of the IMU 26 exceeding the IMU threshold 22*c* may be sufficient for the road roughness algorithm 14 to execute the IMU flag 20*c*.

Once the road roughness algorithm 14 executes the flag protocol 20, the road roughness algorithm 14 executes a fusion function 44 of the flags 20*a*-20*e*. Each of the flags 20*a*-20*e* have a different weight, such that the weights of the flags 20*a*-20*e* are added (i.e., fused) together. If the sum total of the fusion of the flags 20*a*-20*e* exceeds a fusion threshold 22*f*, then the road roughness algorithm 14 may execute an anomaly flag 20*f*. Some of the flags 20*a*-20*e* may have a lower weight level compared to others, such that despite the lowered weight the anomaly flag 20*f* may be executed based on comparative flags 20*a*-20*e*. For example, the wheel flag 20*a* may have a higher weight as compared to the torsion bar flag 20*e*. Thus, the weight of the wheel flag 20*a* may have greater influence on the road roughness algorithm 14 as part of the fusion function 44 when determining whether to execute the anomaly flag 20*f*. The fusion of the wheel flag 20*a*, the ride height flag 20*b*, the IMU flag 20*c*, the maturity bar flag 20*d*, and the torsion bar flag 20*e* may define the road anomaly 50 for the road roughness algorithm 14.

Referring still to FIGS. 2-9, the parameters 28 of the road roughness algorithm 14 may be adjusted or otherwise controlled via a control and mitigation function 60. The parameters 28 may reflect a parameter severity 30*b*, which may be adjusted via the control and mitigation function 60. The parameters 28 may be adjusted by the road roughness algorithm 14 in response to the IMU flag 20*c*. For example, the road roughness algorithm 14 may identify the parameter severity level 30*b* prior to adjusting the parameters and may use the parameter severity level 30*b* when executing the control and mitigation function 60.

The control and mitigation function 60 is configured to mitigate the road anomaly 50 by modifying the parameters 28. For example, the control and mitigation function 60 may result in an adjustment to wheel functions 62 and/or a speed 64 of the vehicle 100. The controller 12 is configured to adjust the parameters 28 by executing the control and mitigation function 60 to adjust the wheel functions 62 and/or speed 64 of the vehicle 100, which may assist in avoiding or minimizing impact with the road anomaly 50.

With specific reference to FIGS. 4-9, exemplary flow diagrams for the road roughness system 10 are illustrated. Each of the flow diagrams is described in more detail above with respect to the various features referenced in the respective flow diagrams. FIG. 4 illustrates an exemplary flow diagram of the road roughness algorithm 14 assessing the wheel data 116. At 400, the road roughness algorithm 14 receives the wheel data 116 and determines, at 402, whether the wheel data 116 exceeds the wheel threshold 22*a*. If the wheel data 116 exceeds the wheel threshold 22*a*, then the road roughness algorithm 14 determines, at 404, whether the wheel flag 20*a* is on or activated. If not, then the road roughness algorithm 14 turns on or executes the wheel flag 20*a*, at 406.

If the wheel data 116 does not exceed the wheel threshold 22*a*, then road roughness algorithm 14 determines, at 408, whether the time duration exceeds the time threshold 22*d*. If the time duration does not exceed the time threshold 22*d*, then the road roughness algorithm 14 holds, at 410, the current wheel flag 20*a*. The road roughness algorithm 14 then assembles, at 412, the wheel flag 20*a* with the wheel severity level 30*a* and the wheel ID 120. If the time duration exceeds the time threshold 22*d*, then the road roughness algorithm 14 turns off, at 414, the wheel flag 20*a* and resets, at 416, the wheel flag counter 24.

If the wheel data 116 exceeds the wheel threshold 22*a*, at 402, and the wheel flag 20*a* is active, at 404, then the road roughness algorithm 14 adds, at 418, to the wheel flag counter 24. The road roughness algorithm 14 sets, at 420, the wheel flag 20*a* at the current time point and assembles, at 412, the wheel flag 20*a* with the wheel severity level 30*a* and the wheel ID 120.

FIG. 5 illustrates an exemplary flow diagram of the road roughness algorithm 14 assessing the ride height data 132. The road roughness algorithm 14 determines, at 500, whether the wheel flag 20*a* is active. If not, then the road roughness algorithm 14 does not activate or execute the ride height flag 20*b*, at 502. If the wheel flag 20*a* is activated, the road roughness algorithm 14 determines, at 504, whether the ride height data 132 exceeds the ride height threshold 22*b*. If not, then the then the road roughness algorithm 14 does not activate or execute the ride height flag 20*b*, at 502. If the ride height data 132 exceeds the ride height threshold 22*b*, then the road roughness algorithm 14 executes or otherwise turns on the ride height flag 20*b*, at 506.

FIG. 6 illustrates an exemplary flow diagram of the road roughness algorithm 14 assessing the torsion bar data 142. The road roughness algorithm 14 determines, at 600, whether the wheel flag 20*a* is active. If not, then the road roughness algorithm 14 does not activate or execute the torsion bar flag 20*e*, at 602. If the wheel flag 20*a* is activated, the road roughness algorithm 14 determines, at 604, whether the torsion bar data 142 exceeds the torsion bar threshold 22*e*. If not, then the then the road roughness algorithm 14 does not activate or execute the torsion bar flag 20*e*, at 602. If the torsion bar data 142 exceeds the torsion bar threshold 22*e*, then the road roughness algorithm 14 executes or otherwise turns on the torsion bar flag 20*e*, at 606.

FIG. 7 illustrates an exemplary flow diagram of the road roughness algorithm 14 assessing the IMU 26. The road roughness algorithm 14 determines, at 700, whether the wheel flag 20*a* is active. If not, then the road roughness algorithm 14 does not activate or execute the IMU flag 20*c*, at 702. If the wheel flag 20*a* is activated, the road roughness algorithm 14 determines, at 704, whether the primary components 26*a* exceed the IMU threshold 22*c*. If not, then the then the road roughness algorithm 14 does not activate or execute the IMU flag 20*c*, at 702. If the primary components 26*a* exceed the IMU threshold 22*c*, then the road roughness algorithm 14 executes or otherwise turns on the IMU flag 20*c*, at 706.

Figure 8:
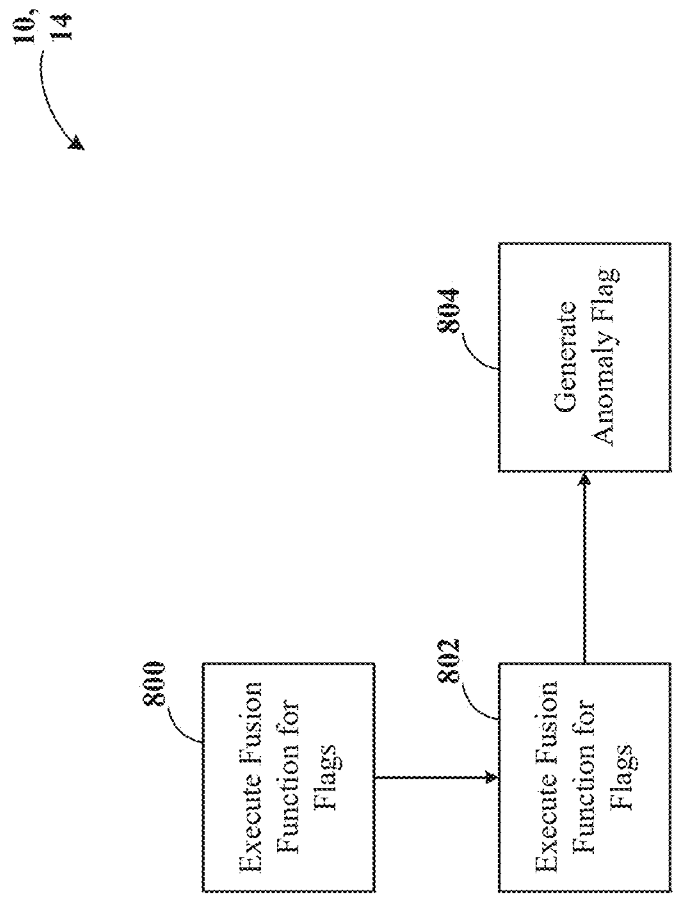

FIG. 8 illustrates an exemplary flow diagram of the road roughness algorithm 14 executing the fusion function 44. The road roughness algorithm 14 identifies, at 800, each of the flags 20*a*-20*e*. At 802, the road roughness algorithm 14 executes the fusion function 44 for the flags 20*a*-20*e*. At 804, the road roughness algorithm 14 executes the anomaly flag 20*f*.

Figure 9:
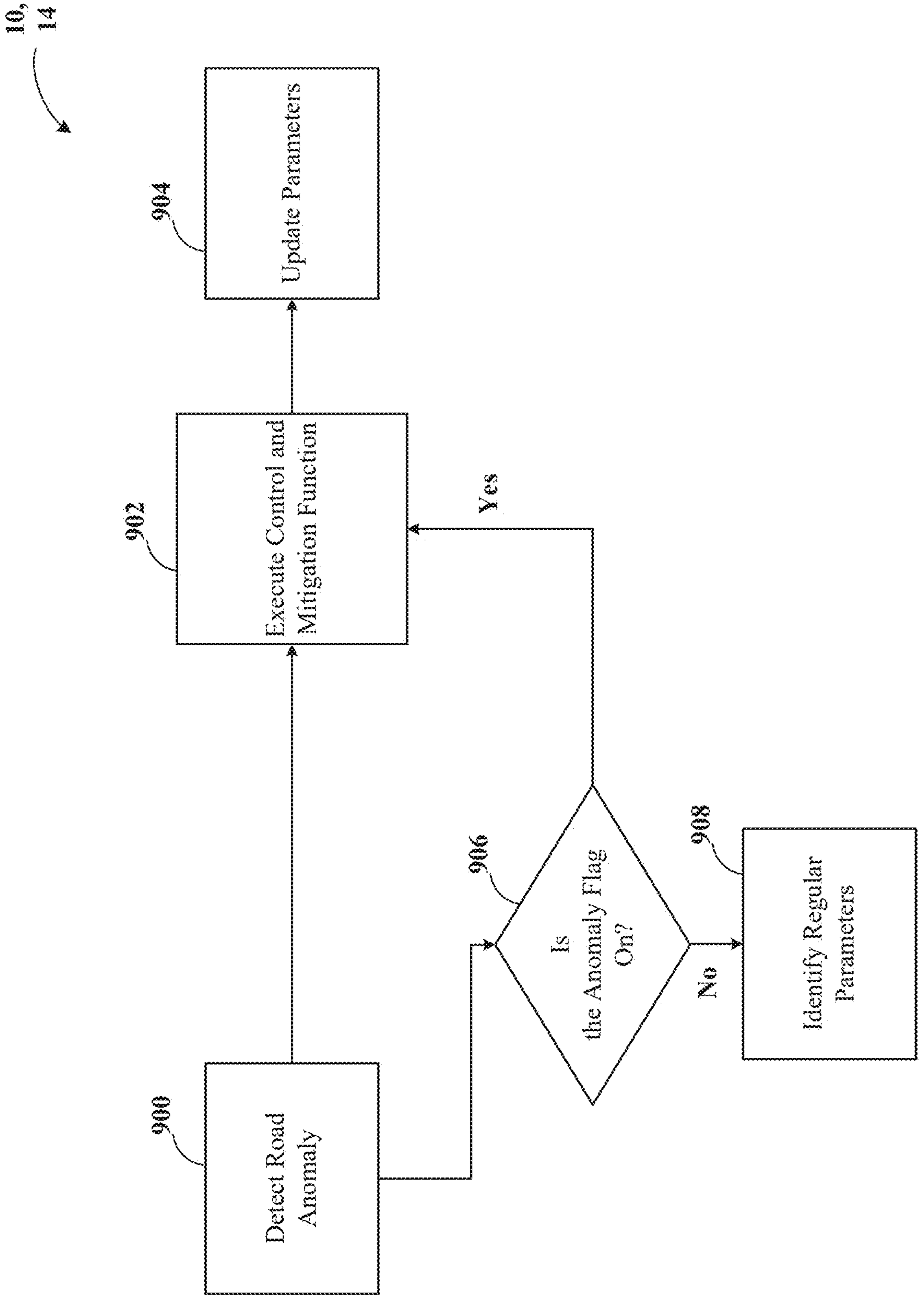

FIG. 9 illustrates an exemplary flow diagram of the road roughness algorithm 14 updating the parameters 28. At 900, the road roughness algorithm 14 detects the road anomaly 50 and executes, at 902, the control and mitigation function 60. The road roughness algorithm 14 updates, at 904, the parameters 28. The road roughness algorithm 14 determines, at 906 whether the anomaly flag 20*f* is on or otherwise active. If yes, then the road roughness algorithm 14 proceeds with execution of the control and mitigation function 60, at 902. If the anomaly flag 20*f* is inactive or otherwise off, then the road roughness algorithm 14 identifies, at 908, regular parameters 28.

Figure 10:
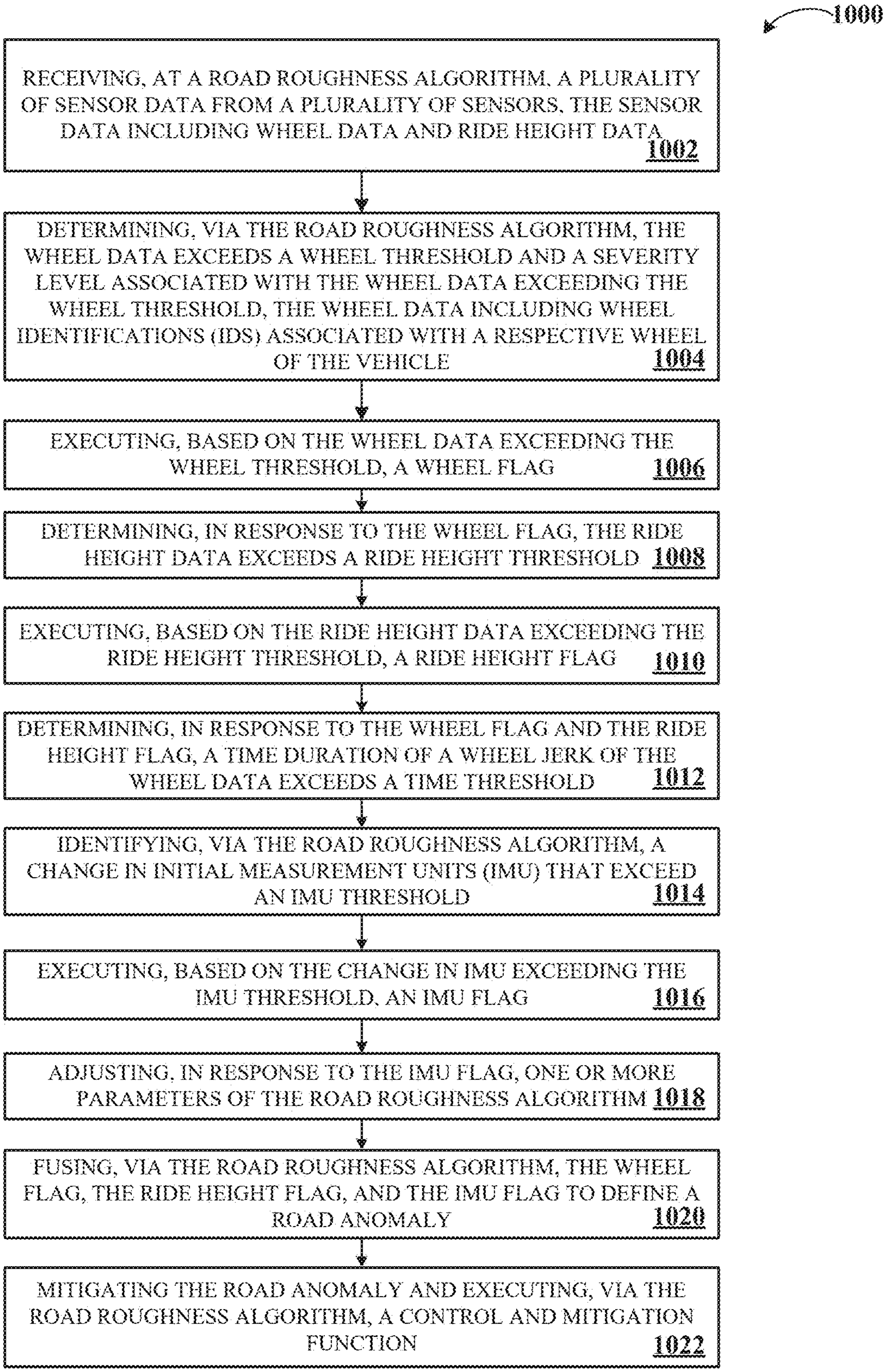
FIG. 10 is an example method for a road roughness system according to the present disclosure.

Referring now to FIG. 10, an example method 1000 for the road roughness system 10 is illustrated. At 1002, a road roughness algorithm 14 receives a plurality of sensor data 110 from a plurality of sensors 112 of a vehicle 100. The sensor data 110 includes wheel data 116 and ride height data 132. At 1004, the road roughness algorithm 14 determines that the wheel data 116 exceeds a wheel threshold 22*a* and a severity level 30*a* associated with the wheel data 116 exceeding the wheel threshold 22*a*. The wheel data 116 includes wheel identifications (IDs) 120 associated with a respective wheel 102 of the vehicle 100. Based on the wheel data 116 exceeding the wheel threshold 22*a*, the road roughness algorithm 14 executes, at 1006, a wheel flag 20*a*. At 1008, the road roughness algorithm 14 determines, in response to the wheel flag 20*a*, the ride height data 132 exceeds a ride height threshold 22*b*. The road roughness algorithm 14 executes, at 1010, based on the ride height data 132 exceeding the ride height threshold 22*b*, a ride height flag 20*b*. At 1012, the road roughness algorithm 14 determines, in response to the wheel flag 20*a* and the ride height flag 20*b*, a time duration 42 of a wheel jerk 118 of the wheel data 116 exceeds a time threshold 22*d*.

The road roughness algorithm 14 identifies, at 1014, a change in initial measurement units (IMU) 26 that exceed an IMU threshold 22*c*. At 1016, the road roughness algorithm 14 executes, based on the change in IMU 26 exceeding the IMU threshold 22*c*, an IMU flag 20*c*. The road roughness algorithm 14 adjusts, at 1018, in response to the IMU flag 20*c*, one or more parameters 28 of the road roughness algorithm 14. At 1020, the road roughness algorithm 14 fuses the wheel flag 20*a*, the ride height flag 20*b*, and the IMU flag 20*c* to define a road anomaly 60. At 1022, the road roughness algorithm 14 mitigates the road anomaly 60 and executes a control and mitigation function 50.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

receiving, at a road roughness algorithm, a plurality of sensor data from a plurality of sensors of a vehicle, the sensor data including wheel data and ride height data;

determining, via the road roughness algorithm, the wheel data exceeds a wheel threshold and a severity level associated with the wheel data exceeds the wheel threshold;

executing, based on the wheel data exceeding the wheel threshold, a wheel flag, the wheel flag including one or more wheel identifications (IDs), the road roughness algorithm being configured to identify a wheel of the vehicle based on the wheel IDs;

determining, based on the wheel flag, the ride height data exceeds a ride height threshold;

executing, based on the ride height data exceeding the ride height threshold, a ride height flag;

determining, based on the wheel flag and the ride height flag, a time duration of a wheel jerk of the wheel data exceeds a time threshold;

identifying, via the road roughness algorithm, a change in initial measurement units (IMU) that exceed an IMU threshold;

executing, based on the change in the IMU exceeding the IMU threshold, an IMU flag;

adjusting, based on the IMU flag, one or more parameters of the road roughness algorithm;

fusing, via the road roughness algorithm, the wheel flag, the ride height flag, and the IMU flag to define a road anomaly;

mitigating the road anomaly by reducing a speed of the vehicle; and executing, via the road roughness algorithm, a control and mitigation function.

2. The method of claim 1, wherein determining, based on the wheel flag and the ride height flag, the time duration of the wheel jerk of the wheel data exceeds the time threshold includes comparing the time duration to a maturity flag.

3. The method of claim 2, further comprising identifying a condition of the vehicle from the wheel data and determining, based on the comparison of the time duration with the time threshold, the condition has existed for a period of time.

4. The method of claim 3, further comprising raising, based on the condition existing for the period of time, the maturity flag.

5. The method of claim 1, wherein adjusting the one or more parameters includes identifying a severity level of the one or more parameters.

6. The method of claim 1, wherein the wheel data includes wheel jerk data.

7. The method of claim 1, wherein mitigating the road anomaly includes adjusting the wheel corresponding to the wheel ID.

8. The method of claim 1, wherein determining the wheel data exceeds the wheel threshold includes generating a second derivative of the wheel data and identifying the wheel jerk of the wheel data.

9. The method of claim 1, wherein the IMU includes at least two primary components and identifying the change in the IMU includes identifying a change in the at least two primary components exceeds the IMU threshold.

10. A road roughness system for a vehicle, the road roughness system comprising:

data processing hardware; and memory hardware in communication with the data processing hardware, the memory hardware storing instructions that when executed on the data processing hardware cause the data processing hardware to perform operations comprising:

receiving, at a road roughness algorithm, a plurality of sensor data from a plurality of sensors of the vehicle, the sensor data including wheel data and ride height data;

determining, via the road roughness algorithm, the wheel data exceeds a wheel threshold and a severity level associated with the wheel data exceeds the wheel threshold;

executing, based on the wheel data exceeding the wheel threshold and the severity level of the wheel data, a wheel flag, the wheel flag including one or more wheel identifications (IDs), the road roughness algorithm being configured to identify a wheel of the vehicle based on the wheel ID;

determining, based on the wheel flag, the ride height data exceeds a ride height threshold;

executing, based on the ride height data exceeding the ride height threshold, a ride height flag;

determining, based on the wheel flag and the ride height flag, a time duration of a wheel jerk of the wheel data exceeds a time threshold;

identifying, via the road roughness algorithm, a change in initial measurement units (IMU) that exceed an IMU threshold;

executing, based on the change in the IMU exceeding the IMU threshold, an IMU flag;

adjusting, based on the IMU flag, one or more parameters of the road roughness algorithm; and fusing, via the road roughness algorithm, the wheel flag, the ride height flag, and the IMU flag to define a road anomaly;

mitigating the road anomaly by reducing a speed of the vehicle; and executing, via the road roughness algorithm, a control and mitigation function.

11. The road roughness system of claim 10, wherein determining, based on the wheel flag and the ride height flag, the time duration of the wheel jerk of the wheel data exceeds the time threshold includes comparing the time duration to a maturity flag.

12. The road roughness system of claim 11, further comprising identifying a condition of the vehicle from the wheel data and determining, based on the comparison of the time duration with the time threshold, the condition has existed for a period of time.

13. The road roughness system of claim 12, further comprising raising, based on the condition existing for the period of time, the maturity flag.

14. The road roughness system of claim 10, wherein adjusting the one or more parameters includes identifying a severity level of the one or more parameters.

15. The road roughness system of claim 10, wherein the wheel data includes wheel jerk data.

16. The road roughness system of claim 10, wherein mitigating the road anomaly includes adjusting the wheel corresponding to the wheel ID.

17. The road roughness system of claim 10, wherein determining the wheel data exceeds the wheel threshold includes generating a second derivative of the wheel data and identifying the wheel jerk of the wheel data.

18. The road roughness system of claim 10, wherein the IMU includes at least two primary components and identifying the change in the IMU includes identifying a change in the at least two primary components exceeds the IMU threshold.

19. A road roughness system for a vehicle, the road roughness system comprising:

data processing hardware; and memory hardware in communication with the data processing hardware, the memory hardware storing instructions that when executed on the data processing hardware cause the data processing hardware to perform operations comprising:

receiving, at a road roughness algorithm, a plurality of sensor data from a plurality of sensors of the vehicle, the sensor data including wheel data and ride height data;

determining, via the road roughness algorithm, the wheel data exceeds a wheel threshold and a severity level associated with the wheel data exceeds the wheel threshold, the wheel data including wheel identifications (IDs) associated with a respective wheel of the vehicle;

executing, based on the wheel data exceeding the wheel threshold, a wheel flag, the wheel flag including one or more of the wheel IDs, the road roughness algorithm being configured to identify a wheel of the vehicle based on the wheel ID;

determining, in response to the wheel flag, the ride height data exceeds a ride height threshold;

executing, based on the ride height data exceeding the ride height threshold, a ride height flag;

determining, in response to the wheel flag and the ride height flag, a time duration of a wheel jerk of the wheel data exceeds a time threshold;

identifying, via the road roughness algorithm, a change in initial measurement units (IMU) that exceeds an IMU threshold;

executing, based on the change in the IMU exceeding the IMU threshold, an IMU flag;

adjusting, in response to the IMU flag, one or more parameters of the road roughness algorithm;

fusing, via the road roughness algorithm, the wheel flag, the ride height flag, and the IMU flag to define a road anomaly; and mitigating the road anomaly by reducing a speed of the vehicle and executing, via the road roughness algorithm, a control and mitigation function.

20. The road roughness system of claim 19, wherein mitigating the road anomaly includes adjusting the wheel corresponding to the respective wheel ID.

* * * * *